United States Patent [19]
Moen

[11] 3,730,222
[45] May 1, 1973

[54] SINGLE LEVER MIXING VALVE

[76] Inventor: Alfred M. Moen, 25 Lakeview Drive, Grafton, Ohio

[22] Filed: May 27, 1971

[21] Appl. No.: 147,359

[52] U.S. Cl. ............... 137/625.17, 251/172, 251/317
[51] Int. Cl. .............................................. F16k 11/02
[58] Field of Search .................... 337/625.17, 636.2, 337/636.4; 251/368, 148, 151, 152, 192, 51, 172, 454.6, 363, 314, 317, 316

[56] References Cited

UNITED STATES PATENTS

| | | | |
|---|---|---|---|
| 3,204,656 | 9/1965 | Moen | 137/625.17 X |
| 3,532,123 | 10/1970 | Anthony | 251/172 X |
| 3,460,571 | 9/1969 | Moen | 137/625.17 |
| 2,943,792 | 7/1960 | Moen | 137/625.17 X |

*Primary Examiner*—William R. Cline
*Attorney*—Parker, Carter & Markey

[57] ABSTRACT

A mixing valve for use in a faucet includes a sleeve which may be formed of plastic and a stem positioned within the sleeve and reciprocal and rotatable relative thereto. The sleeve has hot and cold water inlet ports and at least one outlet port. The stem has inlet and outlet openings such that movement of the stem is effective to control the volume and temperature of water discharged from the sleeve. The stem has an air passage connecting its opposite ends. There is a generally cylindrical seal enclosing the sleeve adjacent its inlet ports and effective to form a seal between the exterior of the sleeve, the exterior of the stem within the sleeve and the interior of the housing enclosing the stem and sleeve. The valve includes means for preventing water hammer.

17 Claims, 9 Drawing Figures

Patented May 1, 1973

INVENTOR.
Alfred M. Moen
BY Parker, Carter & Markey
Attorneys.

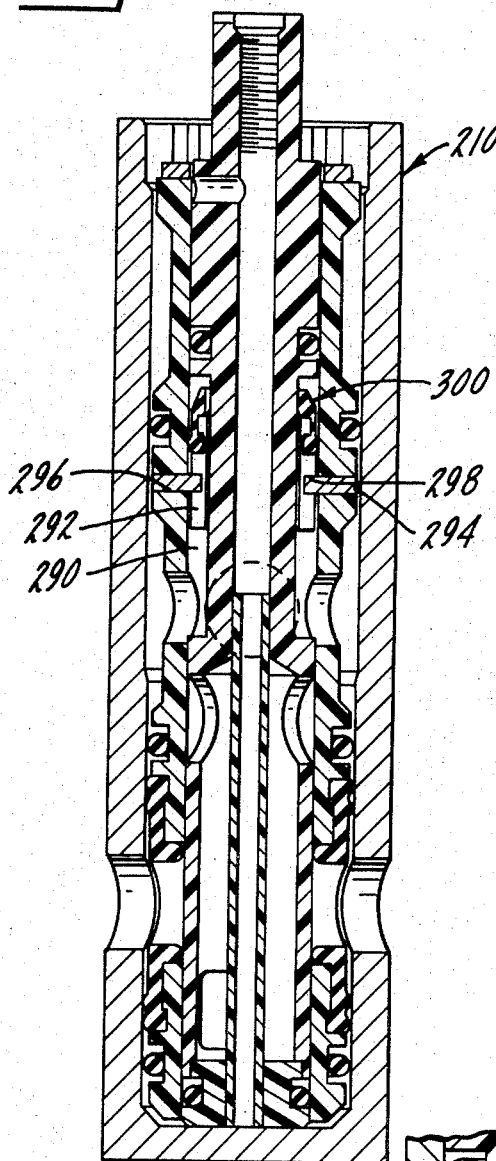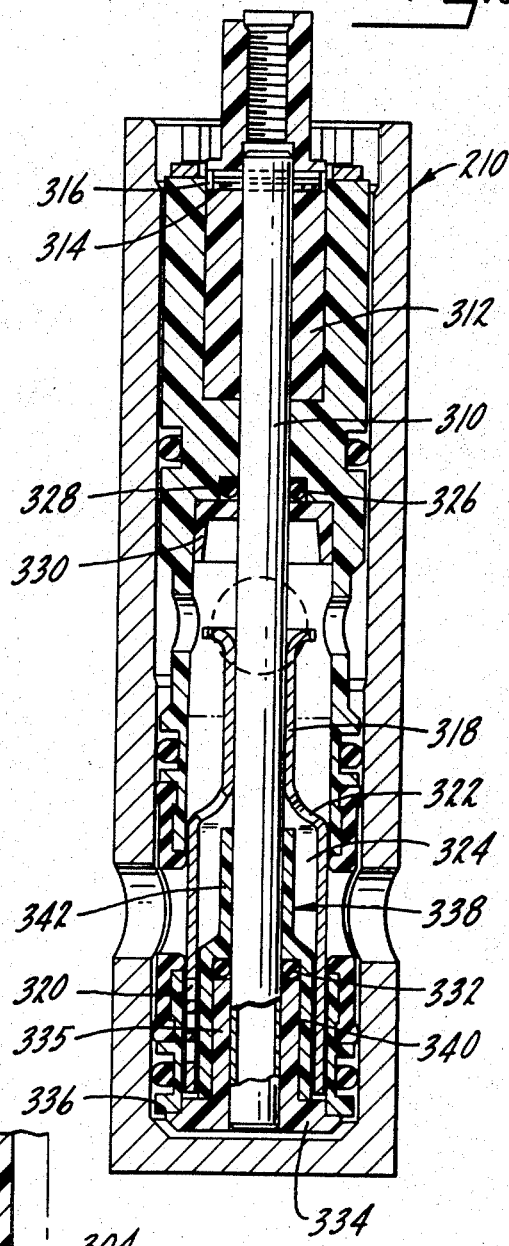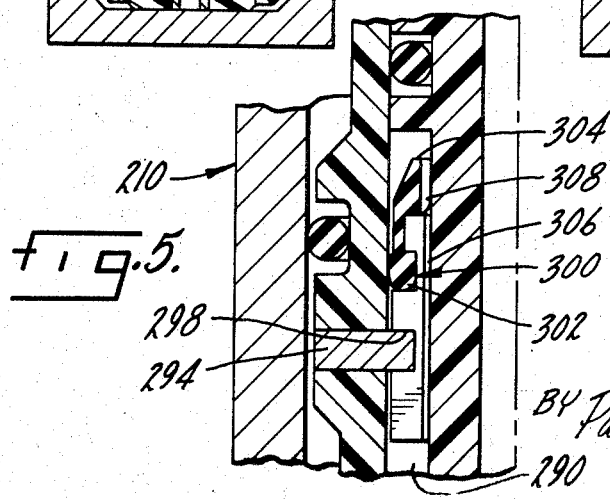

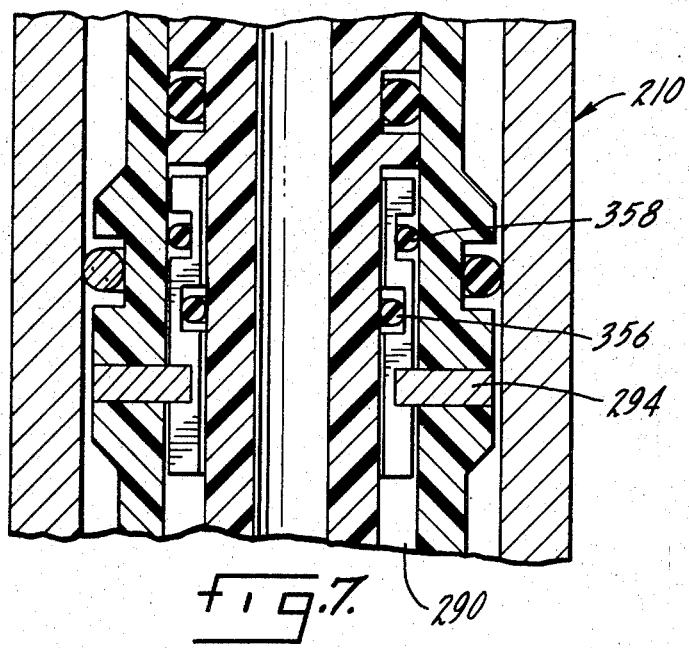
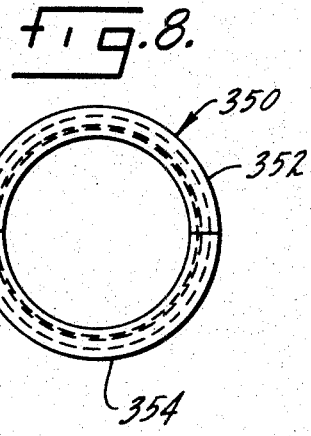
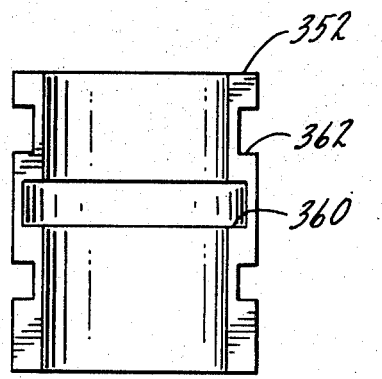
INVENTOR.
Alfred M. Moen
BY Parker, Carter & Markey
Attorneys.

SINGLE LEVER MIXING VALVE

SUMMARY OF THE INVENTION

The present invention relates to a mixing valve for use in a faucet and has particular relation to a mixing valve of the type described in which a substantial portion thereof is formed of plastic.

Another purpose is a mixing valve having a plastic sleeve and a plastic stem positioned within the sleeve.

Another purpose is a mixing valve of the type described utilizing a cylindrical seal member having portions thereof extending through the sleeve and into sealing contact with a movable stem.

Another purpose is a mixing valve of the type described including means for preventing rapid closure of the stem.

Another purpose is a plastic mixing valve including means for retarding movement of the stem relative to the sleeve.

Another purpose is a mixing valve that is pressure balanced.

Other purposes will appear in the ensuing specification, drawings and claims.

BRIEF DESCRIPTION OF THE DRAWINGS

The invention is illustrated diagrammatically in the following drawings wherein:

FIG. 4 is an axial section, similar to FIG. 2, showing a modified form of the invention, FIG. 5 is an enlargement of a portion of FIG. 4, FIG. 6 is an axial section, similar to FIGS. 2 and 4, showing yet a further modified form of the invention, FIG. 7 is a section similar to FIG. 5 showing a modified form of water hammer prevention means, FIG. 8 is a plan view of the parts forming a pressure wall in FIG. 7, and FIG. 9 is a side view of one of the parts of FIG. 8.

DESCRIPTION OF THE PREFERRED EMBODIMENT

Figure 1:
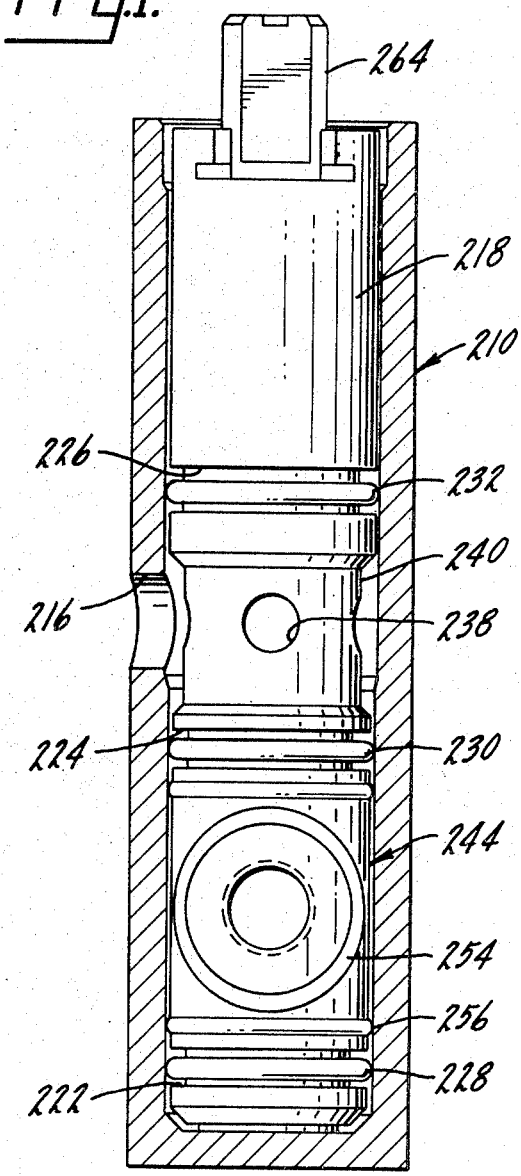
FIG. 1 is a side view of a mixing valve of the type described.
Figure 2:
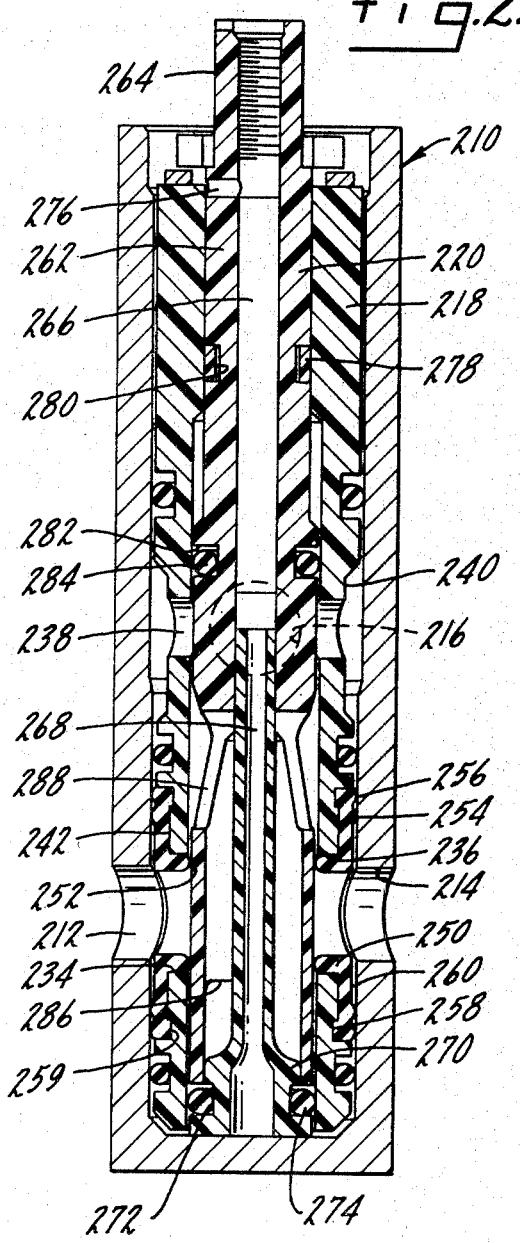
FIG. 2 is an axial section through the valve of FIG. 1.

In FIGS. 1 and 2 a generally cylindrical housing is indicated at 210 and may have hot and cold water inlet ports 212 and 214. An outlet port 216 is indicated in dotted lines. The housings 210 may form a part of a faucet construction, for example for use in the kitchen, lavatory or bathtub. The invention relates to such a faucet in which the temperature and volume of the water discharged from the faucet are controlled by rotation and reciprocation of a single lever or handle.

Positioned within the housing 210 is a sleeve 218 and mounted for rotation and reciprocation in the sleeve 218 is a stem 220. As shown in FIGS. 1 and 2, both the stem and sleeve are formed of a plastic material.

Figure 3:
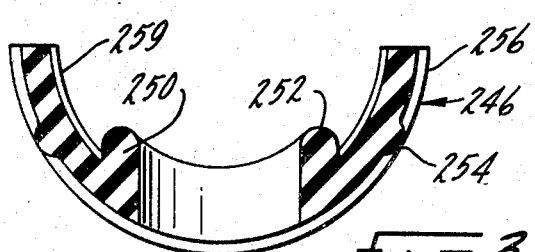
FIG. 3 is an end view in section of a portion of a seal member used herein.

The sleeve 218 may have exterior grooves 222, 224 and 226 containing seal rings 228, 230 and 232 which are effective to form a seal between the exterior of the sleeve and the interior of the housing. The sleeve 218 may have hot and cold water inlet ports 234 and 236 and a plurality of circumferentially spaced outlet ports 238 positioned adjacent a recess 240 in the exterior of the sleeve. Adjacent the hot and cold water inlet ports 234 and 236 there is a recess 242 in the exterior of the sleeve and a seal 244 is positioned within the recess. The seal 244 is formed by substantially identical halves, one of which is indicated at 246 in FIG. 3. Each of the seal halves has port seal portions 250 extending through the inlet ports 234 and 236 with the inner rim 252 of the port seal portions bearing against the exterior of the stem 220. The seal halves may each have generally circular beads 254 which surround the port seal portions 250 and end beads 256 which extend about each end of the generally cylindrical seal construction. Beads 254 are effective to form a seal between the exterior of the sleeve and the interior of the housing 210, with the end beads 256 primarily functioning to position the seal during insertion and/or removal. There is a small chamber 260 inside of each bead 254 and between the interior of the sleeve and the port seal portions 250. The chambers 260 will fill up with water during operation and exert an inwardly-directed force upon the port seal portions 250 to assist in sealing the interior rims 252 against the exterior of the stem 220. There are mating grooves 258 and projections 259 at each end of the seal halves to anchor the seal construction onto the sleeve and to hold it in place during insertion and removal of the valve.

The stem 220, which is formed of plastic, includes a core 262. The protruding end 264 of the core is arranged to receive a handle, not shown. There is a bore 266 running the length of the core, with the bore being in communication with a passage 268 in a stem member or piston 270. The piston 270 forms the bottom end of the stem and has a groove 272 containing an O-ring 274 which seals the inner end of the stem. The passage 266 and passage 268 are connected to atmosphere through a small passage 276 near the top end of the stem. Thus the inner end of the stem is at atmospheric prssure and there are no unbalancing forces acting upon the stem.

Both the piston 270 and the core 262 are preferably formed of plastic. Since the sleeve is also formed of plastic, it has been found that in order to provide sufficient control of the rotation and reciprocation of the stem, it is necessary to provide a braking or retarding force between the stem and sleeve. A ring 278 may be positioned within a groove 280 in the exterior of the stem with the ring being slightly oversize so that it bears outwardly against the interior of the sleeve and exerts a frictional force between the sleeve and the stem. Thus, movement of the stem relative to the sleeve can be more easily controlled.

The exterior of the stem may include a groove 282 containing an O-ring 284. There is an opening 286 in the stem adjacent its inner end and a plurality of discharge openings 288 in the exterior of the stem, with the openings 286 and 288 forming a passage through the hollow stem.

In operation, the stem is rotated and reciprocated relative to the sleeve to control water flow. When the stem inlet is in register with the sleeve inlet ports the outlets 288 of the stem will be in communication with the outlet ports 238 of the sleeve so that movement of the stem controls the volume and temperature of the water passing through the valve. The valve is pressure-balanced inasmuch as there is atmospheric pressure at each end of the stem due to the aligned axial air passages 266 and 268 which communicate with opposite ends of the stem. Since the cross section of the stem which is subject to water pressures is constant, the water-created pressures upon the stem will be equal and opposite and thus will provide no moving force on the stem. Thus, the valve will remain in any given open or closed position and there will be no movement due to pressures exerted on the valve.

In the modification of FIGS. 4 and 5, the sleeve and stem are substantially the same as shown in FIGS. 1 and 2. A pressure chamber indicated at 290 is formed between the exterior of the stem and the interior of the sleeve by relieving the exterior of the stem. Positioned within the chamber 290 is a wall member 292, which may be formed by a pair of identical halves. The wall member is fixed to the sleeve by a key 294 which passes through slots 296 in the sleeve and into grooves 298 in the wall halves. A seal member 300, holding the wall halves together, is positioned adjacent one end of the wall member 292 and has a seal ring portion 302 which forms a seal with the interior of the sleeve. The opposite end 304 of the seal 300 is effective to seal against the exterior of the stem. There is a clearance 306 between the interior of the wall member and the exterior of the stem so as to form a water passage of limited cross section. There are a plurality of slots 308 in the interior of the seal portion 304 in communication with the clearance 306 so that water may pass from opposite sides of the wall in the chamber 290 as the stem is moved relative to the sleeve.

When the stem is in the closed position of FIG. 4, there will be no water pressure in chamber 290. As soon as the valve is opened, water will flow into the bottom of chamber 290, through the clearance 306 and slots 308, and into the top of chamber 290. Thus, when the valve is in the open position, there will be water on both sides of the wall 292. Seal portion 302 precludes any seepage along the exterior. When the valve is to be closed, since there is water in the top of chamber 290, the stem can only be closed as fast as the water can move through slots 308 and clearance 306 back to the bottom of the chamber 290. The same hydraulic resistance also is present when the valve is opened. The pressure chamber construction described provides an anti-hammer device in that it prevents closure of the valve member at such a rate as to cuase undesirable noise within the plumbing system.

The slots 308 are important in providing the hydraulic resistance to valve opening and closing. A rapid movement of the stem will cause the rubber about the slots to distort and reduce the size of the slots, thus retarding opening and closing movement of the stem.

The construction of FIGS. 7, 8 and 9 is the same as FIGS. 4 and 5, except for the anti-hammer details. A wall member 350 is made up of two identical halves 352 and 354 shown in FIGS. 8 and 9. Wall member 350, positioned within pressure chamber 290 is fixed in position by key 294. O-rings 356 and 358 are positioned in grooves 360 and 362. Wall member 350 is loosely positioned in chamber 290 and thus there are clearance spaces between the interior of the sleeve and the exterior of the wall member and between the interior of the wall member and the exterior of the stem.

When the valve is opened, water will reach the top of chamber 290 by flowing between the halves 352 and 354 of the loosely positioned wall member. The water path will be outside of O-ring 356 and inside O-ring 358. The same path will be used when the valve is closed. In both opening and closing the above-described path will provide hydraulic resistance to movement of the stem. Rapid movement, either in opening or closing, will cause the O-rings to distort and further reduce the size of the water path.

The sleeve of FIG. 6 has not been described in detail, as it is similar to the other forms of the invention. The stem includes a hollow metal tube 310 mounting an enlargement 312 at its top, which enlargement is constructed to receive a conventional handle or lever. A roll pin 314 extending through an aligned opening 316 in the enlargement is effective to fasten the enlargement to the metal stem 310. The opening 316 provides a connection between the atmosphere and the interior of the hollow metal stem 310. A piston or plunger 318, which may be formed of metal, is fastened to the stem 310 intermediate its ends. There are a plurality of inlet openings 320 in the plunger 318 and a plurality of outlet openings 322. The inlet and outlet openings are in communication through a chamber 324. When the stem is moved to the open position, the inlet openings 320 are in communication with the sleeve inlets and the stem outlet openings 322 are in communication with the sleeve outlets.

A seal 326 is positioned within a groove 328 at the top of the mixing chamber and is held in place by a cup 330. The cup 330 may be formed of plastic and may be spun into position against the sleeve, which spinning operation welds the two plastic pieces together, thus forming a firm mounting for the seal 326.

A similar seal 332 is mounted at the other end of the mixing chamber within the sleeve. A plastic end piece 334, which is preferably adhesively secured to the end of the sleeve, as at 336, forms the bottom of the valve assembly. A cup 338 has an outer portion 340 which may be secured to the extension 335 of the end piece 334 and may have an inner portion 342 which forms a bearing surface for the stem. The cup 338 cooperates with the extension 335 of the end piece 334 to form a chamber for the seal 332.

The structure of FIG. 6 operates in the same manner as disclosed before. The sleeve may be completely formed of plastic. The stem may be formed of metal. Reciprocation and rotation of the stem is effective to control the volume and temperature of water discharged through the valve.

Of importance in the invention is the fact that the sleeve, and in some cases the stem, is formed of a plastic material, whereas in all previous valves of this general type, both of these elements were formed of metal. Because of the nature of the plastic, it is advantageous to provide a means for retarding movement of the stem relative to the sleeve to provide effective control of the faucet.

Whereas the preferred form of the invention has been shown and described herein, it should be realized that there may be many modifications, substitutions and alterations thereto.

I claim:

1. A mixing valve including a sleeve having hot and cold water inlet ports and at least one outlet port therein, a hollow stem within the sleeve, inlet and outlet openings in said stem, rotation and reciprocation of said stem relative to said sleeve controlling the relative positions of said sleeve inlet ports and outlet port and said stem inlet and outlet openings to regulate the volume and temperature of water passing from said sleeve inlet ports, through said stem to the sleeve outlet port, an axially extending air passage in said stem connecting the areas adjacent opposite ends of the stem, seal means between said stem and sleeve, and a generally cylindrical seal enclosing said sleeve adjacent said sleeve inlet ports and adapted to form a seal between the exterior of said sleeve and the interior of a housing, said seal having port seal portions extending through said sleeve inlet ports and being in sealing contact with said stem, said cylindrical seal having a plurality of sections, there being a port seal portion in each section.

2. The structure of claim 1 further characterized in that said sleeve is formed of plastic.

3. The structure of claim 1 further characterized in that said stem is at least partly formed of plastic.

4. The structure of claim 1 further characterized in that said sleeve is formed of plastic and said stem is at least partly formed of plastic, and means positioned between the sleeve and stem to retard relative movement therebetween.

5. The structure of claim 4 further characterized in that said means for retarding movement includes a ring positioned about the stem and bearing against the interior of the sleeve.

6. The structure of claim 5 further characterized by a groove in the exterior of said stem, said ring being positioned in said groove.

7. The structure of claim 1 further characterized in that said stem is at least partly formed of plastic and includes a core member extending substantially the length of the sleeve and having an air passage through a portion thereof and a piston forming one end of the stem and having an air passage therethrough in alignment with the core member air passage, said piston being positioned generally within the core.

8. The structure of claim 1 further characterized in that said cylindrical seal is formed of two substantially identical halves, there being a port seal portion in each half.

9. The structure of claim 1 further characterized by and including a pressure chamber between the sleeve and stem, water in said chamber being effective to resist rapid movement of the stem relative to the sleeve.

10. The structure of claim 9 further characterized in that said pressure chamber includes a recess in the exterior of said stem, a wall positioned in said recess and fixed to the sleeve, and means forming a limited water passage through said wall.

11. The structure of claim 10 further characterized by and including a seal between said wall and the interior of the sleeve.

12. The structure of claim 11 further characterized in that said limited water passage is formed between the exterior of the stem and the interior of said wall and includes means forming a passage through said seal.

13. The structure of claim 10 further characterized in that said sleeve, stem and wall are all formed of plastic.

14. The structure of claim 10 further characterized in that the means fixing said wall to the sleeve includes a key extending through the sleeve and wall.

15. The structure of claim 1 further characterized in that said sleeve is formed of plastic, said stem including a metal tube substantially smaller in diameter than the sleeve and a piston attached to and movable with the metal tube.

16. The structure of claim 15 further characterized in that the stem inlet and outlet openings are formed in said piston.

17. The structure of claim 15 further characterized by and including means for sealing opposite ends of said metal tube including seal rings extending about the tube and means forming a part of the sleeve for positioning said seal rings.

* * * * *